Oct. 27, 1959 E. G. CLARK 2,910,530

SYSTEM FOR DISCRIMINATORY SIGNAL CARRIER IDENTIFICATION

Filed Nov. 7, 1955

INVENTOR.
EDWARD GARY CLARK
BY
Deen V. Hazeltine
ATTORNEY

United States Patent Office 2,910,530

Patented Oct. 27, 1959

2,910,530

SYSTEM FOR DISCRIMINATORY SIGNAL CARRIER IDENTIFICATION

Edward Gary Clark, Oreland, Pa., assignor to Philco Corporation, Philadelphia, Pa., a corporation of Pennsylvania Application November 7, 1955, Serial No. 545,285

4 Claims. (Cl. 178—5.8)

Figure 1:
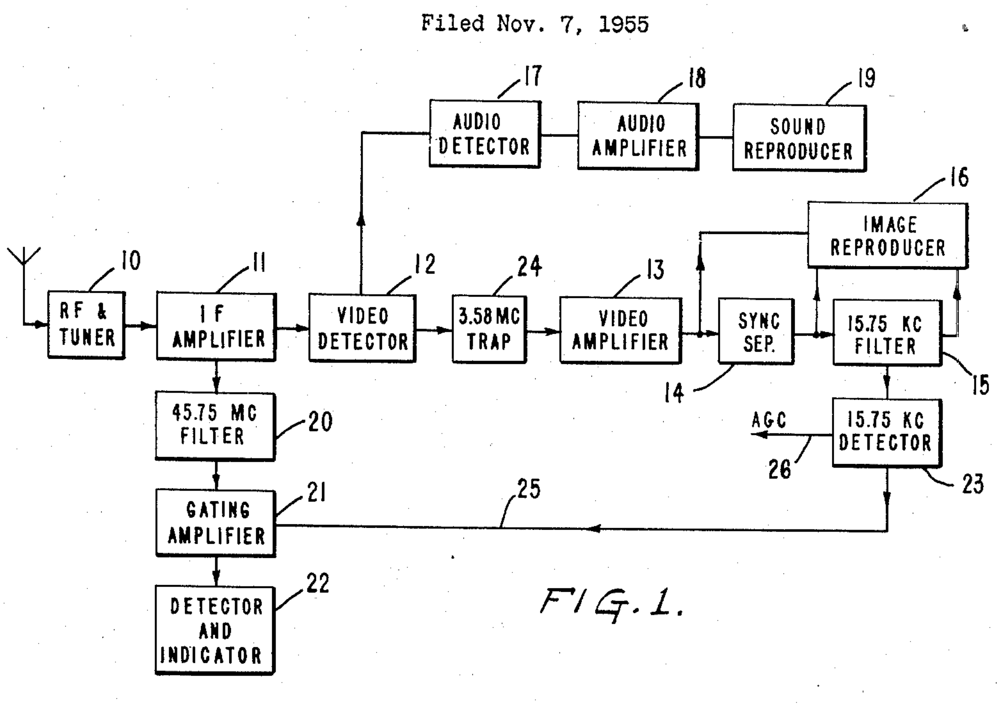

This invention relates to a method and system for identification, or detection of the presence, of a particular signal carrier in a multi-carrier signal channel. In its broader aspect, the invention is applicable in any instance where confusion of carriers may exist with respect to identification of a particular carrier. The invention is particularly applicable, however, to identification of the picture carrier in a television receiver of the intercarrier-sound type having a single intermediate frequency channel for both the picture and sound carriers. Hence the invention will be described herein with reference to this specific preferred application.

This invention, therefore, has for its principal and broad object the provision of a novel method and system for discriminatory signal carrier identification in any instance where the invention may find useful application.

A more specific object of the invention is to provide a method and system for identification of the picture carrier in a television receiver of the intercarrier-sound type.

In this preferred application of the invention, it may serve various purposes. For example, it may be utilized as a medium by which correct tuning of the television receiver may be indicated; or it may be utilized as a medium of automatic tuning control in a signal-seeking receiver. In the description to follow, the invention will be described primarily with respect to its application as a medium by which correct tuning of a television receiver may be indicated.

Prior to the advent of television receivers of the intercarrier-sound type, television receivers employing separate intermediate frequency channels for the picture and sound carriers could be accurately tuned by using the sound carrier as a reference and relying upon correct relative alignment of the picture and sound I.-F.'s. In some such receivers, a discriminator responsive to deviations from the frequency of the sound carrier was used to generate an AFC voltage. However, with the advent of the intercarrier-sound type of receiver, that method could not be used because such a receiver is capable of broad tuning without change of the intercarrier frequency. Therefore, the need arose for a simple method by which accurate tuning of such a television receiver could be effected with a minimum of additional circuitry. The present invention is particularly intended to supply this need.

It should be noted particularly that, in the case of a television receiver of the intercarrier-sound type, the mere derivation of a signal from the I.-F. channel cannot be relied upon as a tuning reference, for it is possible that a tuning indicator or automatic tuning device controlled by such signal may indicate or may be locked in when the sound carrier is occupying the normal position of the picture carrier.

The present invention is based upon the broad concept that, where confusion of carriers in a common channel may exist, one of the carriers may be identified by deriving a signal at the intended channel frequency of the carrier, selectively detecting a characteristic modulation of the carrier to be identified, and determining from detection of the characteristic modulation that the derived signal corresponds to the carrier to be identified. In a television receiver of the intercarrier-sound type, the picture carrier may be utilized as the medium for accurate tuning control or indication; and according to this invention, sync modulation of the picture carrier may be made to serve as the means of identification of that carrier. Preferably the horizontal sync modulation of the picture carrier is utilized as the means of identification thereof. Since the horizontal sync pulses are of relatively low frequency and of constant amplitude, they may be used as a means of positive identification of the picture carrier by production of a voltage indicative of the presence of that carrier, as hereinafter described.

Thus, in the preferred application of this invention, a system is provided comprising means for deriving, from the intermediate frequency channel of an intercarrier-sound television receiver, a signal having the I.-F. picture carrier frequency, means for selectively detecting the horizontal sync modulation of the picture carrier, and means for determining from detection of said modulation that the derived signal corresponds to the picture carrier.

Figure 2:
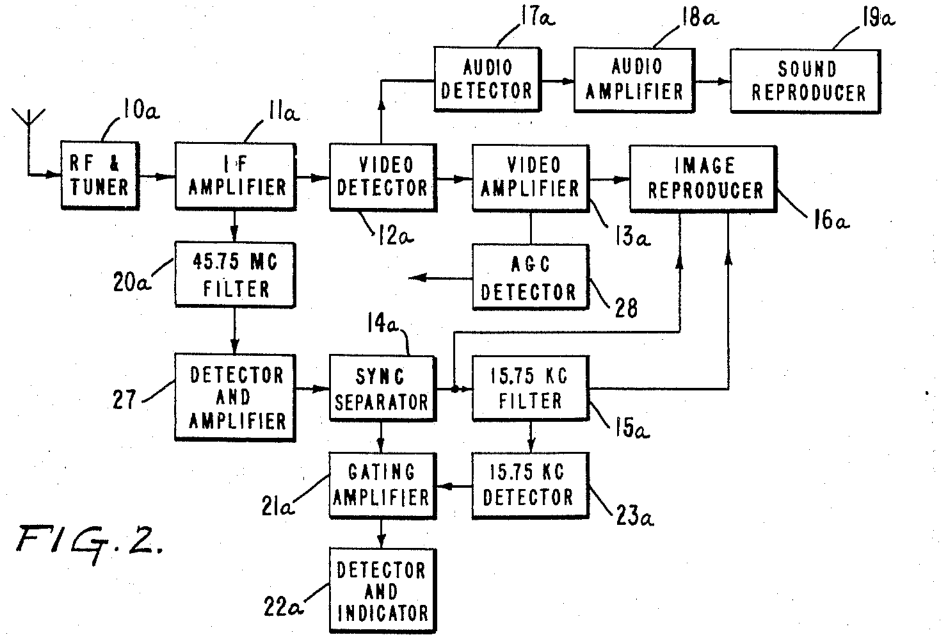

The invention may be fully understood from the following detailed description with reference to the accompanying drawing wherein Fig. 1 is a block diagram of a system according to one embodiment of the present invention; and Fig. 2 is a similar diagram of another embodiment of the invention.

Referring to Fig. 1, there is shown in block form a television receiver of the intercarrier-sound type. Such receiver comprises the R.-F. and tuner section 10, the common intermediate frequency section 11, the video detector 12, the video amplifier 13, the sync separator 14, filter 15, and the image reproducer 16. The receiver further comprises the audio detector 17, the audio amplifier 18, and the sound reproducer 19.

The application of the present invention to such a television receiver may be said to involve the incorporation of three elements. The first element is a means for producing a signal when a carrier having the I.-F. picture carrier frequency is within a prescribed frequency departure from the correct point on the vestigial sideband slope of the I.-F. passband. Such means may comprise a narrow band filter coupled to the I.-F. channel and adapted to select the I.-F. picture carrier frequency. The second element is a means for differentiating between the picture carrier and other carriers, such as sound or chrominance sub-carrier, which may produce a similar signal. The purpose of this second means is to identify the output of the above-mentioned filter as a signal corresponding to the picture carrier and not another carrier. Preferably, the identification of the picture carrier is accomplished by selectively detecting the strong sync frequency sidebands it contains. The third element is a means for utilizing conjointly the two actions above indicated so as to effect tuning control or indication only when the picture carrier is close to the desired tuning point.

The first action above indicated, i.e., that of I.-F. picture carrier frequency selection, may be achieved in the system of Fig. 1 by means of a narrow band filter 20, which may be a high Q resonant circuit, coupled to the I.-F. amplifier and tuned to the I.-F. picture carrier, e.g., 45.75 mc. Thus filter 20 may be coupled to an I.-F. amplifier plate in such a manner as not to affect the I.-F. response and to be unaffected by AGC action. The filter output is supplied to a gating amplifier 21, the output of which may be supplied to detecting and visualindicating means represented by block 22. The latter means may include a visual voltage indicator such as an electronic "tuning eye" tube.

The second action above indicated, i.e., that of differentiation between the picture carrier and other carriers, is achieved by deriving from the picture carrier identifying information. In the embodiment of Fig. 1, the horizontal frequency (e.g. 15.75 kc.) sidebands are used, in preference to the 60-cycle vertical, as a means of identification of the picture carrier. Thus in the system of Fig. 1, the narrow band or high Q filter provides the horizontal scan control in well known manner, and for the purpose of this invention a detector 23 is connected to receive the horizontal sync component from the filter 15. While harmonics of 15.75 kc. could be used, it is more convenient to use the fundamental frequency as this can be derived directly from filter 15. Because of the absence of strong sync frequency sidebands on carriers other than the picture carrier, the output of filter 15 will be substantially zero in the event of severe mistuning; and under this condition the detector 23, which is driven by the filter 15, will have no output. In the case of a color television receiver, protection against video or sync separator detection of the sync sidebands present on the chrominance sub-carrier may be provided by the 3.58 mc. trap 24.

The third action above indicated, i.e., the conjoint utilization of the first two actions so as to effect tuning control or indication only when the picture carrier is close to the desired tuning point, is accomplished by utilizing the output of detector 23 to control the signal transfer of the gating amplifier 21. Thus, when the picture carrier is close to the desired tuning point, there is an output from filter 20, and an enabling voltage is supplied from detector 23 to the gating amplifier 21 over connection 25. At all other times, there will be no output from the detector 23, and hence no output from the amplifier 21.

In operation of the system, as the receiver is tuned over the band, there will be present successively, at the output of filter 20, peaks corresponding to the picture carrier and the sound carrier respectively. The D.-C. output of the 15.75 kc. detector 23 is high over a wide range, but is substantially zero in the vicinity of the sound carrier. Hence, the 45.75 mc. amplifier 21 is "enabled" only for the picture carrier and is disabled for the sound carrier.

It will be apparent from the embodiment illustrated in Fig. 1 that this system can make use of many of the existing elements, and functions, in a television receiver to remove ambiguity from a simple tuning indicator. The selectivities required in the 15.75 kc. filter 15 for horizontal scanning and for tuning indication are compatible. In this system the sync pickoff circuit may be arranged so that the 15.75 kc. detector 23 also provides amplified, noise immune AGC voltage at 26.

Fig. 2 shows another embodiment of the present invention, which makes use of the 45.75 mc. selectivity to further improve sync performance. In Fig. 2 the elements corresponding to those of Fig. 1 are similarly designated by the same reference numerals with the suffix *a*. In this instance the output of filter **20*a*, which is a narrow band signal of high signal-to-noise ratio, is supplied to a detector and amplifier 27. The output of the latter is supplied to the sync separator 14*a* whose grid and cathode in their normal operation serve as a peak detector, developing a D.-C. voltage proportional to the carrier passed through the 45.75 mc. filter 20*a*. This D.-C. voltage is supplied to the gating amplifier 21*a*. If necessary or desired, the D.-C. voltage may be filtered prior to its application to the gating amplifier. If the signal supplied to the sync separator 14*a* corresponds to the picture carrier, the sync components are separated and the horizontal component is selected by filter 15*a***.

As in the system of Fig. 1, the gate **21*a* is controlled from filter 15*a* through detector 23*a*. In this embodiment, AGC voltage may be derived from a detector 28 connected to the video amplifier 13*a***.

It will be seen that the system of Fig. 2 operates in the same manner as does that of Fig. 1, insofar as identification of the picture carrier is concerned. The only difference is that in Fig. 2 both the derived signal and the gate control voltage are derived from the output of the filter **20*a***.

While the invention has been illustrated with specific reference to tuning indication, as previously stated, it may be used for other purposes. For example, it may be used to effect automatic tuning control in a signal-seeking receiver. Thus the output of the gate may be utilized to effect lock-in of an automatic tuning device. It is contemplated, of course, that this invention may be utilized for any purpose to which it may be adapted.

It is important to note that this invention is applicable both to monochrome and color receivers. This results from the fact that the signal components used by this invention are present in any composite television signal whether it be monochrome or color.

Although the invention has been described with reference to certain embodiments, it is not limited thereto but contemplates such modifications and further embodiments as may occur to those skilled in the art.

I claim:

1. In a receiver adapted to receive simultaneously two frequency-spaced modulated carriers one of which has characteristic modulation which distinguishes it from the other; a single intermediate frequency channel wherein, when the receiver is properly tuned, the first carrier appears at a first predetermined intermediate frequency and the second carrier appears at a second predetermined intermediate frequency, and when the receiver is mistuned the second carrier may appear at the first intermediate frequency; means for detecting and utilizing the modulation components of said carriers; additional means for deriving from said channel a signal having said first intermediate frequency, which signal may correspond to either of said carriers; normally non-transmissive signal-transfer means; means for supplying to said signal-transfer means a signal corresponding to said derived signal; means for selectively detecting the characteristic modulation of said first carrier; and means for rendering said signal-transfer means transmissive in response to detection of said characteristic modulation, whereby to determine that the derived signal corresponds to said first carrier.

2. A receiver according to claim 1, wherein the first carrier is a picture carrier having a horizontal synchronizing component and the second carrier is a sound carrier, said means for selectively detecting the characteristic modulation of said first carrier including a detector which detects said horizontal synchronizing component.

3. A receiver according to claim 1, wherein said derived signal is supplied directly to said signal-transfer means.

4. A receiver according to claim 1 wherein the means for supplying to said signal-transfer means a signal corresponding to said derived signal comprises means for developing from said derived signal a D.-C. signal corresponding to the derived signal.

References Cited in the file of this patent

UNITED STATES PATENTS

| | | |
|---|---|---|
| 2,173,173 | Lewis | Sept. 19, 1939 |
| 2,448,908 | Parker | Sept. 7, 1948 |
| 2,586,193 | Wendt | Feb. 19, 1952 |
| 2,635,184 | Cotsworth | Apr. 14, 1953 |
| 2,637,772 | Wendt | May 5, 1953 |
| 2,642,491 | Cotsworth | June 16, 1953 |